US012361029B2

(12) United States Patent
Goel et al.

(10) Patent No.: US 12,361,029 B2
(45) Date of Patent: Jul. 15, 2025

(54) SYSTEM AND METHOD TO IMPLEMENT A SCALABLE VECTOR DATABASE

(71) Applicant: DevRev, Inc., Palo Alto, CA (US)

(72) Inventors: Pratyush Goel, Ghaziabad (IN); Nimar Singh Arora, Union City, CA (US); Meher Ritesh Kumar Goru, Bangalore (IN)

(73) Assignee: DevRev, Inc., Palo Alto, CA (US)

( * ) Notice: Subject to any disclaimer, the term of this patent is extended or adjusted under 35 U.S.C. 154(b) by 0 days.

(21) Appl. No.: 18/518,281

(22) Filed: Nov. 22, 2023

(65) Prior Publication Data
US 2024/0168978 A1    May 23, 2024

Related U.S. Application Data

(60) Provisional application No. 63/427,714, filed on Nov. 23, 2022.

(51) Int. Cl.
*G06F 16/28* (2019.01)
*G06F 16/23* (2019.01)

(52) U.S. Cl.
CPC ........ *G06F 16/285* (2019.01); *G06F 16/2358* (2019.01)

(58) Field of Classification Search
CPC .. G06F 16/285; G06F 16/2358; G06F 16/245; G06F 16/28; G06F 16/2237
See application file for complete search history.

(56) References Cited

U.S. PATENT DOCUMENTS

| 8,018,458 | B2 * | 9/2011 | Peterson | H04N 19/96 345/428 |
| 11,226,992 | B1 * | 1/2022 | Ramsey | G06F 16/285 |
| 2015/0149405 | A1 * | 5/2015 | Pathak | G06F 16/2462 707/609 |
| 2016/0094649 | A1 * | 3/2016 | Dornquast | G06F 16/182 709/227 |
| 2017/0302575 | A1 * | 10/2017 | Ward | H04L 69/18 |
| 2020/0236171 | A1 * | 7/2020 | Gupta | G06F 16/27 |
| 2022/0365921 | A1 * | 11/2022 | Scott | G06F 16/2365 |

OTHER PUBLICATIONS

Douze, M. et al, The Faiss Library, In arXiv:2401.08281v2 [cs.LG], Date retrieved from Google, Jan. 2024.

(Continued)

*Primary Examiner* — Ann J Lo
*Assistant Examiner* — Fernando M Mari Valcarcel
(74) *Attorney, Agent, or Firm* — Vista IP Law Group, LLP

(57) ABSTRACT

Techniques for implementing a vector database in a multi-tenant environment are described. A system creates an index of a tenant that scales efficiently in a multi-tenant environment. The index is created by clustering the plurality of vectors into a set of clusters. The created index forms a hierarchical index including plurality of layers and is stored in a primary data storage unit. The system includes an intermediate data storage unit to store new vectors and to avoid re-indexing every time a new vector with an associated operation such as insert, update, and delete, is added. Further, the system provides reliable nearest neighbor vectors from the created index of the tenant. Read operation is performed over the quick-retrieval data, primary data, and intermediate to determine the nearest neighbor vectors.

24 Claims, 9 Drawing Sheets

(56) References Cited

OTHER PUBLICATIONS

Malkov, Y. et al, "Efficient and robust approximate nearest neighbor search using Hierarchical Navigable Small World graphs", IEEE Transactions on Journal Name, Manuscript ID, Date retrieved from Google, Mar. 2016.

Wang, J. et al, "Milvus: A Purpose-Built Vector Data Management System", Proceedings of the 2021 International Conference on Management of Data (SIGMOD '21) Jun. 2021.

Yang, W. et al, "PASE: PostgreSQL Ultra-High-Dimensional Approximate Nearest Neighbor Search Extension", Industry 4: Advanced Functionality, Dated 2020.

Chen, Q. et al, "SPANN: Highly-efficient Billion-scale Approximate Nearest Neighbor Search" In arXiv:2111.08566v1 [cs.DB], Dated Nov. 2021.

Github, https://github.com/spotify/annoy, Date retrieved from Google Jan. 2016.

Weaviate, "HNSW index in depth" Python, 230 Vector Indexing, https://weaviate.io/developers/academy/py/vector_index/hnsw, Date retrieved by Google, Jun. 2024.

Weaviate, "Vector Indexing", https://weaviate.io/developers/weaviate/concepts/vector-index, Date retrieved by Google, Jun. 2024.

Rodreiguez, "Vamana vs. HNSW—Exploring ANN algorithms Part 1", Weaviate Blog, Dated Oct. 2022.

Williams, C., "Annoy vs Faiss: Choosing the Right Tool for Vector Search", Zilliz Blog, Dated Sep. 2024.

Trabelsi, E., "Comprehensive Guide to Approximate Nearest Neighbors Algorithms", Medium, Published in Towards Data Science, Dated Feb. 2020.

Bernhardsson, E., "Nearest neighbors and vector models—part 2—algorithms and data structures" https://erik.bern.com/2015/10/01/nearest-neighbors-and-vectors-models-part-2-how-to-search-in-high-dimensional-spaces.html, Dated Oct. 2015.

Bernhardsson, E., "Nearest neighbor methods and vector models—part 1", https://erikbern.com/2015/09/24/nearest-neighbor-methods-vector-models-part-1, Dated Sep. 2015.

\* cited by examiner ns an image, an audio, or other data types. An array of such data points or "vectors" is stored in a vector database that is designed to provide, in addition to storage, data search and retrieval facilities for vectors, in response to a user query. Accordingly, vector databases may be used in applications, such as image retrieval, natural language processing, recommendation systems, and the like, in which the data points can be used, for instance, to represent images, text, or audio. For the purposes of effectively retrieving data from the database on querying, databases, including vector database, are indexed, i.e., the vectors in the vector database are organized in a pre-ordained manner. The mechanics of indexing of the vectors has a direct bearing on the efficiency and latency experienced by the database in managing a data retrieval query, such as a nearest neighbor search.

SYSTEM AND METHOD TO IMPLEMENT A SCALABLE VECTOR DATABASE

BACKGROUND CROSS-REFERENCE TO RELATED APPLICATIONS

The Present application claims the benefit of priority to U.S. Provisional Application No. 63/472,714 which is hereby incorporated by reference in this entirety.

BACKGROUND

Generally, databases are used to support a wide range of activities, including data storage, data analysis, and data management and may be used to manipulate and process various types of data. For example, one type of data that may be stored in a database is vector data. Vector data represents features of an object in a mathematical and easily analyzable way. A database that is used to store and process vector data may be referred to as a vector database. The vector database indexes and stores vector embeddings and can be used for various data processes, such as for fast retrieval and for serving a nearest neighbor query.

BRIEF DESCRIPTION OF DRAWINGS

The detailed description is provided with reference to the accompanying figures. In the figures, the leftmost digit(s) of a reference number identifies the figure in which the reference number first appears. The same numbers are used throughout the drawings to reference similar features and components.

DETAILED DESCRIPTION

Figure 1:
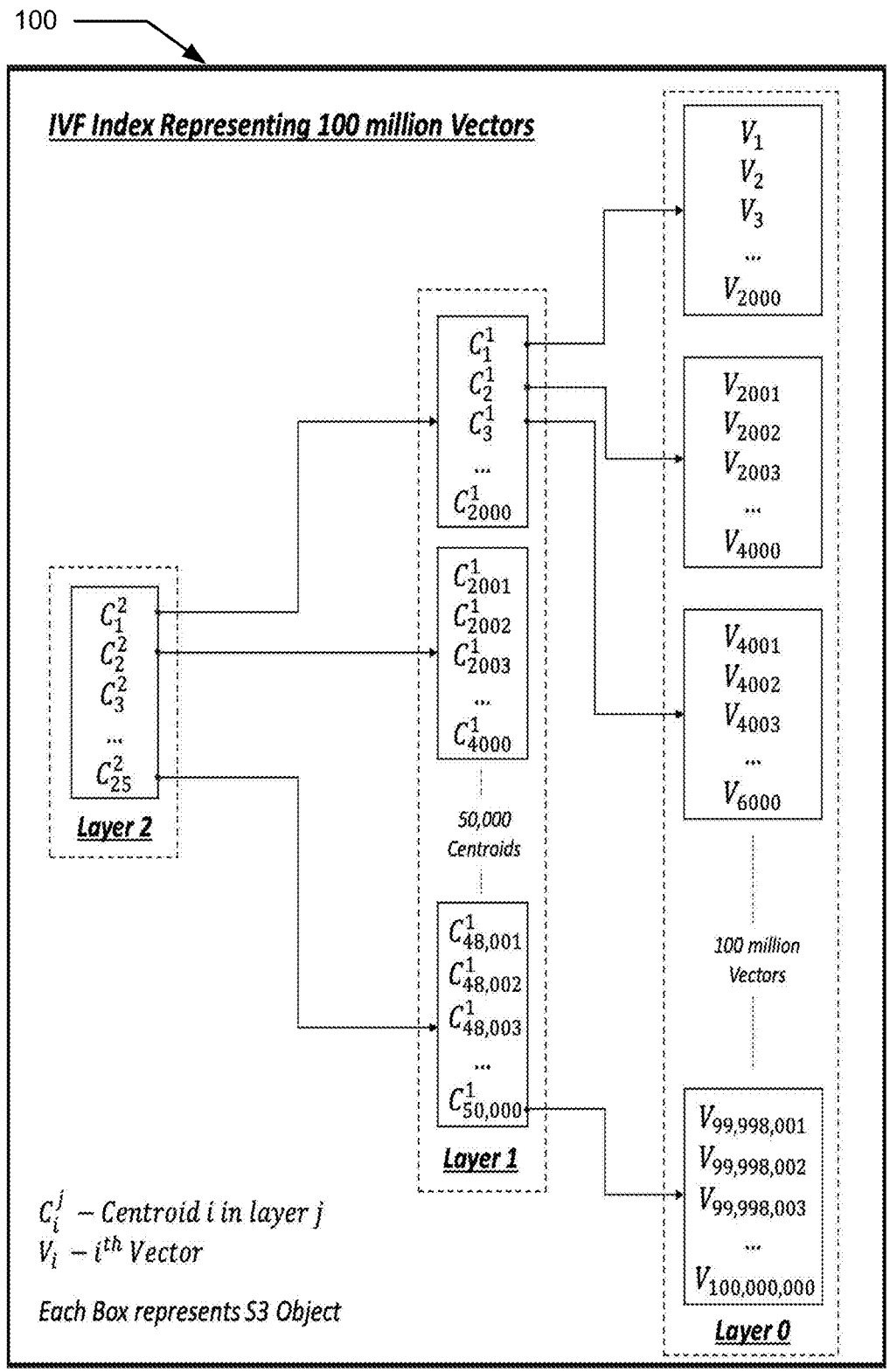
FIG. 1 illustrates an architecture for an index of a vector database for a tenant in a multi-tenant environment, according to an example implementation of the present subject matter.

Vector data can include a series of floating data points and may be used to represent various types of data, such as a text, an image, an audio, or other data types. An array of such data points or "vectors" is stored in a vector database that is designed to provide, in addition to storage, data search and retrieval facilities for vectors, in response to a user query. Accordingly, vector databases may be used in applications, such as image retrieval, natural language processing, recommendation systems, and the like, in which the data points can be used, for instance, to represent images, text, or audio. For the purposes of effectively retrieving data from the database on querying, databases, including vector database, are indexed, i.e., the vectors in the vector database are organized in a pre-ordained manner. The mechanics of indexing of the vectors has a direct bearing on the efficiency and latency experienced by the database in managing a data retrieval query, such as a nearest neighbor search.

Generally, in conventional scenarios, for a nearest neighbor query, the vector database is preprocessed to create an index for querying. For a given query vector, the created index is used to identify a set of vectors that are likely to be close to the query vector. In an example, when a vector database receives a query, the vector database compares the indexed vectors to the query vector to determine the nearest vector neighbors. To establish nearest neighbors, the vector database may rely on mathematical methods, such as similarity measures. Similarity measures can include Cosine similarity to establish similarity by measuring the cosine of the angle between two vectors in a vector space, Euclidean distance to establish similarity by measuring the straight-line distance between vectors, and Dot product to establish similarity by measuring the product of the magnitude of two vectors and the cosine of the angle between them. The nearest neighbor vectors are then retrieved from the indexed vector database and returned to a user as the search results.

The conventional approaches to implement the vector database typically requires the vector data to be held in memory to effectively serve a nearest neighbor query. Such conventional approaches keep any processing latencies too low. However, the conventional approaches do not scale extremely well in a multi-tenant environment and require a significant amount of memory for implementing in the multi-tenant environment. This can lead to immense costs and possibly the inability to function effectively if the available memory is insufficient to hold the vector data.

The present subject matter provides systems, methods, and computer program products for implementing a vector database in a multi-tenant environment. The present subject matter provides techniques to create an index of a tenant that scales efficiently in a multi-tenant environment and provides reliable nearest neighbor vectors from the created index of the tenant.

In an example, the present subject matter provides techniques for creating an index of a tenant in a multi-tenant environment. A vector database may include a plurality of vectors. The index is created for the plurality of vectors of the tenant. In an example, the index is built by clustering the plurality of vectors into a set of clusters. For each cluster of the set of clusters, a centroid is determined. The centroid indicates a center of the cluster, which corresponds to the arithmetic mean of data points assigned to the cluster. The indexing is repeated by clustering the centroids of the set of clusters to form a set of clusters of centroids until a predetermined number of clusters but fewer than those at a lower level in the hierarchy. For instance, the indexing process can be repeated until exactly only a single cluster is left at the top of hierarchical structure. The created index forms a hierarchical index including a plurality of layers. In an example, a first layer may include the set of clusters of vectors, a second layer may include the set of clusters of centroids, and so on till a layer with a single cluster is achieved. The created index is stored in a primary data storage unit. For example, the primary data storage unit may be a simple storage service (S3) storage. The S3 storage is a scalable storage service based on object storage technology. S3 storage provides a high level of durability, with high availability and high performance.

In an example, the index is an offline index and, in said example, the index built and stored in the primary data storage unit cannot be modified. For such indexes, anytime new vectors are inserted/updated/deleted, the vector database for the tenant has to be re-indexed and new clusters have to be computed. Indexing is an expensive process and should be avoided as it incurs high cost.

In an example, to avoid re-indexing every time a new vector with an associated operation, such as insert, update, and delete, is added, the system includes an intermediate data storage unit to store the new vector along with their associated operation. In other words, all the new vectors along with their associated operation are inserted in the intermediate data storage unit. For example, the intermediate data storage unit may be a relational database management system, such as a Postgres® database or any other SQL database. In one example, once 10,000 new vectors are added corresponding to an index inside the intermediate data storage unit, all the vectors are re-indexed using the created index. Subsequently, the vectors inside the intermediate data storage unit may be transferred to the primary data storage unit.

In an example implementation, the present subject matter can be implemented for providing nearest neighbor vectors from in the vector database to a tenant in a multi-tenant environment, for instance, when the vector database has been indexed in the manner described previously. A user may make a request to a service to provide the nearest neighbor vectors from the index of the tenant. The request may include a query vector and input parameters indicating the number of objects to be read to fulfill the request of the user. The request may be, for example, "For a given vector, can you find me the nearest neighbor vectors for a given tenant and a given index?". In another example, the request may be "For a given vector, can you find me the nearest neighbor vectors for a given tenant and a given index by reading 5 objects?".

The system obtains the created index of the tenant and, in said example, the index includes primary data stored in the primary data storage unit, a quick-retrieval data stored in a quick-retrieval data storage unit, and an intermediate data stored in the intermediate data storage unit. The quick-retrieval data may include a segment of periodically queried data from the primary data. The service performs read operation over the quick-retrieval data and the primary data to fetch a first set of vectors based on the user input parameters. Further, the service performs read operation over the intermediate data to fetch a second set of vectors along with an associated operation. The associated operation may be at least one of an insert operation, a delete operation, and an update operation. Both the sets of vectors, i.e., the first set of vectors and the second set of vectors are stored in a memory of the service. The service may process the request by identifying if a vector of the first set of vectors matches a vector in the second set of vectors. If the vector of the first set of vectors matches the vector in the second set of vectors, the associated operation is performed. For example, if a vector associated with a delete operation from the second set of vectors matches with a vector from the first set of vectors, then the delete operation for the vector is performed. Accordingly, the deleted vector will not be considered in the search of nearest neighbor vector. Subsequently, the nearest neighbor vectors for the query vector are determined and provided to the user.

The present subject matter is directed to an improved approach to implement a vector database. The present approach uses cost effective storage and allows the system to store embeddings in the form of vectors and creates indexes for each tenant which can then be queried to compute the nearest neighbor vectors to any input vector. Some embodiments permit enhanced application of an approximate nearest neighbor search, such as similarity search, semantic search, ticket de-duplication and deflections. In the present subject matter, the vector database supports a live index that allows synchronous Create/Update/Delete operations to the vector entities.

Further, the vector database provides fast and efficient billion scale approximate nearest neighbor search for multiple tenants. The indexes are partitioned on the basis of tenant ID to enable multi-tenancy and can be scaled to millions of organizations with each organization containing millions of vectors. An advantage of the present system is that it does not incur any cost (beyond a minimal storage cost) for an index when the corresponding tenant is not utilizing the index. At the same time, the index can provide sub-100 ms response when an index is used for the first time or after a long period of inactivity.

Unlike conventional vector database solutions which does not scale in a multi-tenant environment and requires significant amount of memory associated with high costs, the present subject matter is a 100% on-disk solution, thereby ensuring that the indexes can be scaled to millions of tenants while keeping the memory costs minimal. This approach does use a cache storage unit, but it is used in such a way that only those parts of indexes are cached which are being actively used by the user. Accordingly, the present subject matter provides an improved and efficient approach to implement a vector database.

FIG. 1 illustrates an architecture for an index 100 of a vector database for a tenant in a multi-tenant environment. The multi-tenant environment may include a plurality of tenants. The index may be a quantization-based index, for example, a hierarchical Inverted File Index (IVF index). In the IVF index, the entire vector dataset is arranged into partitions. All partitions are associated with a centroid, and every vector in the dataset is assigned to a partition that corresponds to its nearest centroid.

The vector database includes a plurality of vectors. In an example, there may be 100 million vectors in the vector database, as illustrated by vectors $V_1, V_2, \ldots, V_{100,000,000}$ in FIG. 1. The vectors $V_1, V_2, \ldots, V_{100,000,000}$ are arranged into partitions to form a set of clusters. Each cluster may include a pre-determined number of vectors. For instance, each cluster of the set of clusters may include 2000 vectors, i.e., $V_1$ to $V_{2000}$, $V_{2001}$ to $V_{4000}$, $V_{4001}$ to $V_{6000}$, ..., $V_{99,998,001}$ to $V_{100,000,000}$. Each set of clusters is associated with a centroid. $V_1$ to $V_{2000}$ is associated with a centroid $C_1^1$, $V_{2001}$ to $V_{4000}$ is associated with a centroid $C_2^1$, $V_{4001}$ to $V_{6000}$ is associated with a centroid $C_3^1$, ..., $V_{99,998,001}$ to $V_{100,000,000}$ is associated with a centroid $C_{50,000}^1$. The centroids $C_1^1, C_2^1, C_3^1, \ldots, C_{50,0000}^1$ are arranged into partitions to form a set of clusters of centroids. Each cluster of centroids may include a pre-determined number of centroids. For instance, each cluster of the set of clusters may include 2000 centroids, i.e., $C_1^1$ to $C_{2000}^1$, $C_{2001}^1$ to $C_{4000}^1$, ..., $C_{48,001}^1$ to $C_{50,000}^1$. Each set of clusters of centroids $C_1^1$ to $C_{2000}^1$, $C_{2001}^1$ to $C_{4000}^1$, ..., $C_{48,001}^1$ to $C_{50,000}^1$ is further associated with a centroid. $C_1^1$ to $C_{2000}^1$ is associated with a centroid $C_1^2$, $C_{2001}^1$ to $C_{4000}^1$ is associated with a centroid $C_2^2$, ..., $C_{48,001}^1$ to $C_{50,000}^1$ is associated with a centroid $C_{25}^2$. The centroids $C_1^2$, $C_2^2$, ..., $C_{25}^2$ are arranged to form a single cluster of centroids. The single cluster of centroids may include a pre-determined number of centroids. For instance, the single cluster of centroids may include 25 centroids.

The hierarchical IVF index 100 includes a plurality of layers. For example, as illustrated in FIG. 1, the index 100 with 100 million vector data may include three layers. For instance, the set of clusters of vectors, i.e., $V_1$ to $V_{2000}$, $V_{2001}$ to $V_{4000}$, $V_{4001}$ to $V_{6000}$, ..., $V_{99,998,001}$ to $V_{100,000,000}$ may correspond to a first layer (referred to as layer 0); the set of clusters of centroids, i.e., $C_1^1$ to $C_{2000}^1$, $C_{2001}^1$ to $C_{4000}^1$, ..., $C_{48,001}^1$ to $C_{50,000}^1$ may correspond to a second layer ((referred to as layer 1); and the single cluster of centroids $C_1^2, C_2^2, ..., C_{25}^2$ may correspond to a third layer (referred to as layer 2). In another example, the number of layers in the index 100 may vary depending on the size of the index. The index 100 of the vector database for the tenant may be stored in a primary data storage unit. For example, the primary data storage unit may be a simple storage service (S3) storage.

Figure 2:
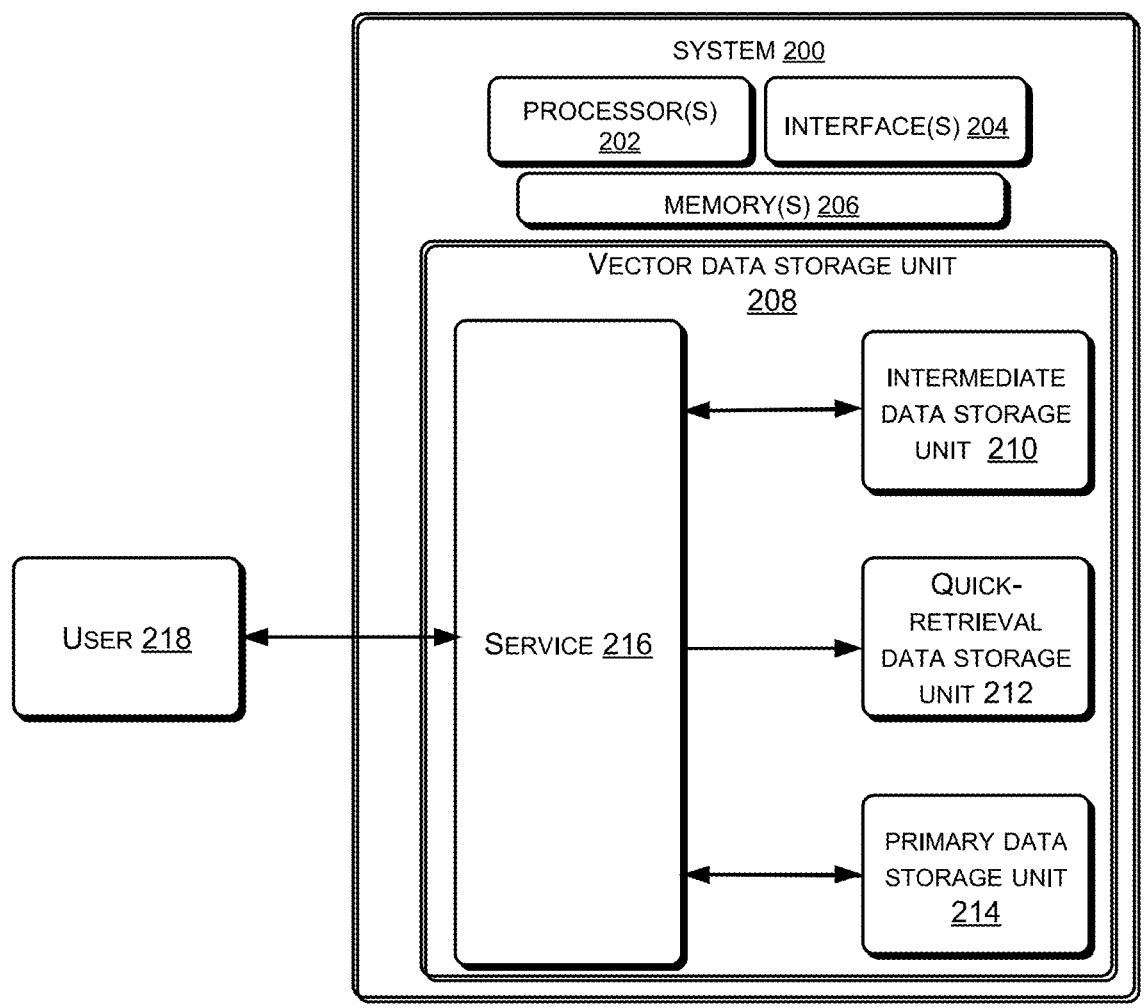
FIG. 2 illustrates a block diagram of a system for implementing a vector database, according to an example implementation of the present subject matter.

FIG. 2 illustrates a block diagram of a system 200 for implementing a vector database, according to an example implementation of the present subject matter. The system 200 may create an index of a tenant that scales efficiently in a multi-tenant environment and may provide reliable nearest neighbor vectors from the created index of the tenant, as will be explained below. The system 200 may include processor(s) 202. The processor(s) 202 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labelled as "processor(s)", may be provided using dedicated hardware as well as hardware capable of executing computer-readable instructions. In one example, the system 200 may be a standalone server or may be a remote server on a cloud computing platform. In a preferred example, the system 200 may be a cloud-based system. The system 200 is capable of delivering applications (such as cloud applications) for providing reliable nearest neighbor vectors from the created index of the tenant.

Further, the system 200 includes interface(s) 204 and memory(s) 206. The interface(s) 204 may allow the connection or coupling of the system 200 with one or more other devices, through a wired (e.g., Local Area Network, i.e., LAN) connection or through a wireless connection (e.g., Bluetooth®, Wi-Fi). The interface(s) 204 may also enable intercommunication between different logical as well as hardware components of the system 200.

The memory(s) 206 may be a computer-readable medium, examples of which include volatile memory (e.g., RAM), and/or non-volatile memory (e.g., Erasable Programmable read-only memory, i.e., EPROM, flash memory, etc.). The memory(s) 206 may be an external memory, or internal memory, such as a flash drive, a compact disk drive, an external hard disk drive, or the like. The memory(s) 206 may further include data which either may be utilized or generated during the operation of the system 200.

The system 200 may further include vector data storage unit 208 and a service 216. The vector data storage unit 208 includes vector data that is either stored or generated as a result of functions implemented by any of the service 216 or the system 200. It may be further noted that information stored and available in the vector data storage unit 208 may be utilized by the service 216 for performing various functions by the system 200. The service 216 may be implemented as a combination of hardware and programming, for example, programmable instructions to implement a variety of functionalities of the vector data storage unit 208. In examples described herein, such combinations of hardware and programming may be implemented in several different ways. For example, the programming for the service 216 may be executable instructions. Such instructions may be stored on a non-transitory machine-readable storage medium which may be coupled either directly with the system 200 or indirectly (for example, through networked means). In an example, the service 216 may include a processing resource, for example, either a single processor or a combination of multiple processors, to execute such instructions. The present approaches may be applicable to other examples without deviating from the scope of the present subject matter.

In an example, the vector data storage unit 208 may include an intermediate data storage unit 210, a quick-retrieval data storage unit 212, and a primary data storage unit 214. The intermediate data storage unit 210 may be configured to store intermediate data. For example, the intermediate data may include metadata information for the index, metadata information for the tenant, and vector operations associated with the index. The primary data storage unit 214 may be configured to store primary data. For example, the primary data may include the index of the tenant for the multi-tenant environment. The quick-retrieval data storage unit 212 may be configured to store quick-retrieval data. For example, the quick-retrieval data may include a cached part of the data from the primary data. The quick-retrieval data has an associated time to live (TTL) of a predetermined time period. The quick-retrieval data storage unit 212 may store the frequently queried data from the primary data. In an example, the service 216 may be used to communicate between the intermediate data storage unit 210, the primary data storage unit 214, and the quick-retrieval data storage unit 212.

The system 200 may be used for creating an index of a tenant in a multi-tenant environment. The vector data storage unit 208 may include a plurality of vectors. The index is created for the plurality of vectors of the tenant. In an example, the index is built by clustering the plurality of vectors into a set of clusters. For each cluster of the set of clusters, a centroid is determined. The centroid indicates a center of the cluster, which corresponds to the arithmetic mean of data points assigned to the cluster. The indexing is repeated by clustering the centroids of the set of clusters to form a set of clusters of centroids until a predetermined number of clusters but fewer than those at a lower level in the hierarchy. For instance, the indexing process can be repeated until exactly only a single cluster is left at the top of hierarchical structure. For example, the index may be similar to the index 100 illustrated in FIG. 1. The created index forms a hierarchical index including plurality of layers. The created index is stored in a primary data storage unit. For example, the primary data storage unit may be a simple storage service (S3) storage. The index built and stored in the primary data storage unit cannot be modified. For such indexes, anytime new vectors are inserted/updated/deleted, the vector database for the tenant has to be re-indexed and new clusters have to be computed. Indexing is an expensive process and should be avoided to incur costs.

In an example, to avoid re-indexing every time a new vector with an associated operation such as insert, update, and delete, is added, the system 200 includes the intermediate data storage unit 210. The system 200 inserts all the new vectors along with their associated operation in the intermediate data storage unit 210. In one example, once 10,000 new vectors are added corresponding to an index inside the intermediate data storage unit 210, all the vectors are re-indexed using the created index 100. Subsequently, the indexed vectors inside the intermediate data storage unit 210 may be transferred to the primary data storage unit 214.

In an example implementation, the system 200 provides nearest neighbor vectors from an index of a tenant in a multi-tenant environment. A user 218 may make a request to the service 216 to provide the nearest neighbor vectors from the index of the tenant. The request may include a query vector and input parameters indicating the number of objects to be read to fulfill the request of the user. In an example, the request may be "For a given vector, can you find me the nearest neighbor vectors for a given tenant and a given index?". In another example, the request may be "For a given vector, can you find me the nearest neighbor vectors for a given tenant and a given index by reading 5 objects?".

The system 200 obtains the created index of the tenant. Upon obtaining the created index, the service 216 performs read operation over the quick-retrieval data storage unit 212 and the primary data storage unit 214 to fetch a first set of vectors based on the user input parameters. In an example, layer 2 as illustrated in FIG. 1 is cached in the quick-retrieval data storage unit 212 as the objects of layer 2 will always be fetched to respond to any nearest neighbor query. In such scenarios, reading layer 2 over the quick-retrieval data storage unit 212 may make the computation of the query request extremely fast when compared to reading layer 2 from the primary data storage unit 214. In addition, since each read operation in the primary data storage unit 214 is associated with a cost, therefore reading layer 2 over the quick-retrieval data storage unit 212 may also be cost-effective.

Further, the service 216 performs read operation over the intermediate data storage unit 210 to fetch a second set of vectors along with an associated operation. The associated operation may be at least one of an insert operation, a delete operation, and an update operation. Both the sets of vectors, i.e., the first set of vectors and the second set of vectors are stored in a memory of the service 216. The service 216 may then process the request by identifying if a vector of the first set of vectors matches a vector in the second set of vectors. If the vector of the first set of vectors matches the vector in the second set of vectors, the associated operation is performed. For example, if a vector associated with a delete operation from the second set of vectors matches with a vector from the first set of vectors, then the delete operation for the vector is performed. Accordingly, the deleted vector will not be considered in the search of nearest neighbor vector. Subsequently, the nearest neighbor vectors for the query vector are determined and provided to the user.

Figure 3:
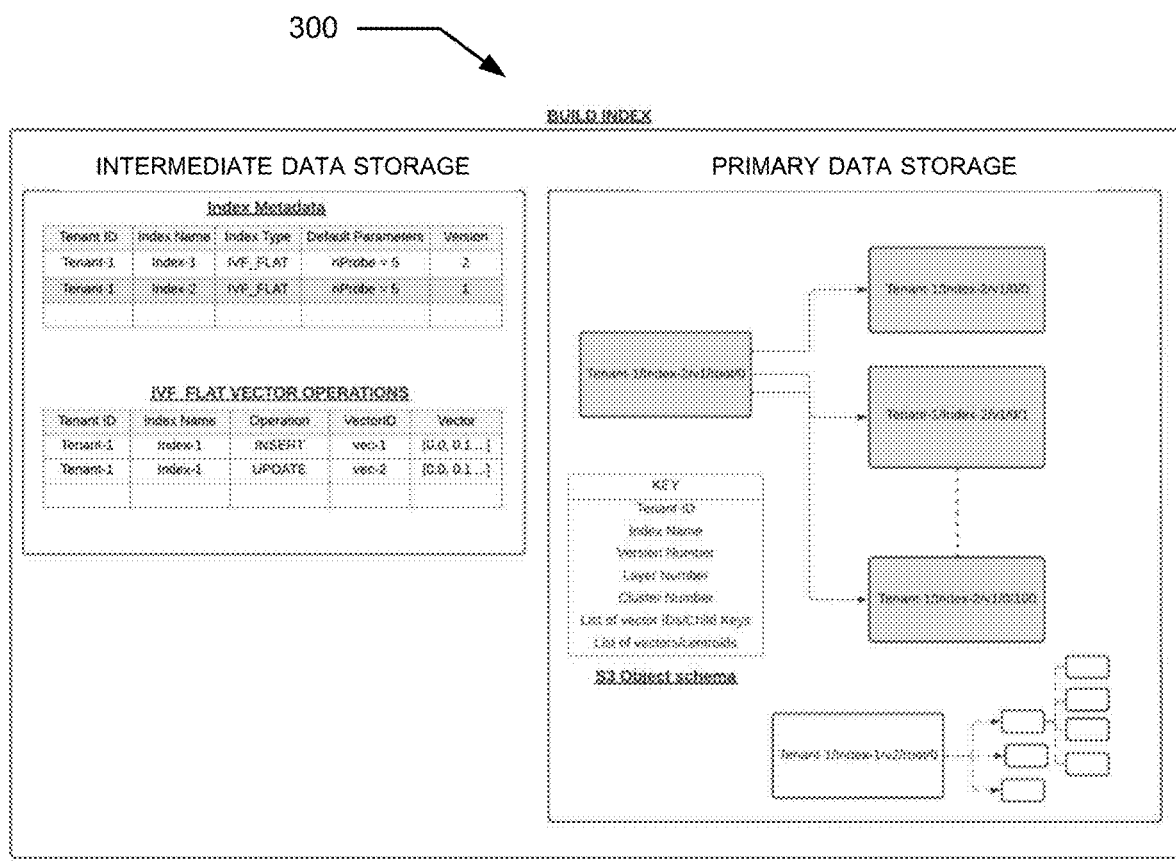
FIG. 3 illustrates an example approach to build an index, according to an example implementation of the present subject matter.

FIG. 3 illustrates an example approach 300 to build an index, according to an example implementation of the present subject matter. For example, FIG. 3 shows a two-layer index saved into the primary data storage unit 214. The system 100 uses an object storage, for example, based upon S3 storage. S3 storage is approximately five times cheaper than solid state drives (SSD's) that are used by the intermediate data storage unit 210 or the quick-retrieval data storage unit 212 (not shown in FIG. 3). Each vector of the plurality of vectors in the primary data storage unit 214 is identified by one or more attributes. The one or more attributes may include a tenant-ID, an index name, a version number, a layer number, a cluster name, a list of vector IDs, a list of vectors, and a list of centroids. Further, FIG. 3 illustrates an example of an object storage schema. The schema indicates a hierarchy index including plurality of layers. The entire index is divided into small chunks of vectors, i.e., clusters which are stored into the S3 storage. Each cluster has a size of a couple MBs and is stored as a separate object in S3. The unique identifier key for each object is generated by using a hash function that is based on the above-mentioned information. Multiple prefixes are created on the basis of tenant ID and index Name. This enables horizontal scalability and allows to scale to as many tenants as required.

In an example, the intermediate data storage unit 210 include two tables. A first table indicates the index metadata and a second table indicates the IVF vector operations. The index metadata in the first table provides a list of existing indexes in the vector database, i.e., the vector data storage unit 208 corresponding to a particular tenant in the multi-tenant environment. The index metadata having the metadata information includes attributes, such as an index name, a tenant ID, an index type, default query parameters, and a version of the index.

In an example, the IVF vector operations in the second table illustrates the operation, such as insert operation, update operation, and delete operation, associated with each index of the tenant. Any insertions/Updates/Deletes to the index are temporarily stored in the second table in vector operations. The second table is partitioned on tenant ID and index name to enable sharding and enable horizontal scalability. For example, as seen in FIG. 3, for Tenant-1 and Index-1, an "insert" operation is associated with vec-1 and an "update" operation is associated with vec-2. In an example, the object storage schema may be computed from the index metadata table. The index metadata table may also help in mapping the index with the vectors/objects to be fetched from the primary data storage unit 214.

In an example, the quick-retrieval data storage unit 212, for example, a Redis cache, can also be used for caching the S3 objects that are being queried periodically. This helps in reducing the latency and the cost associated with each S3 object read. Each object in Redis cache has a TTL of few mins associated with it. This ensures that only those parts of indexes which are being used frequently are cached in memory.

Figure 4:
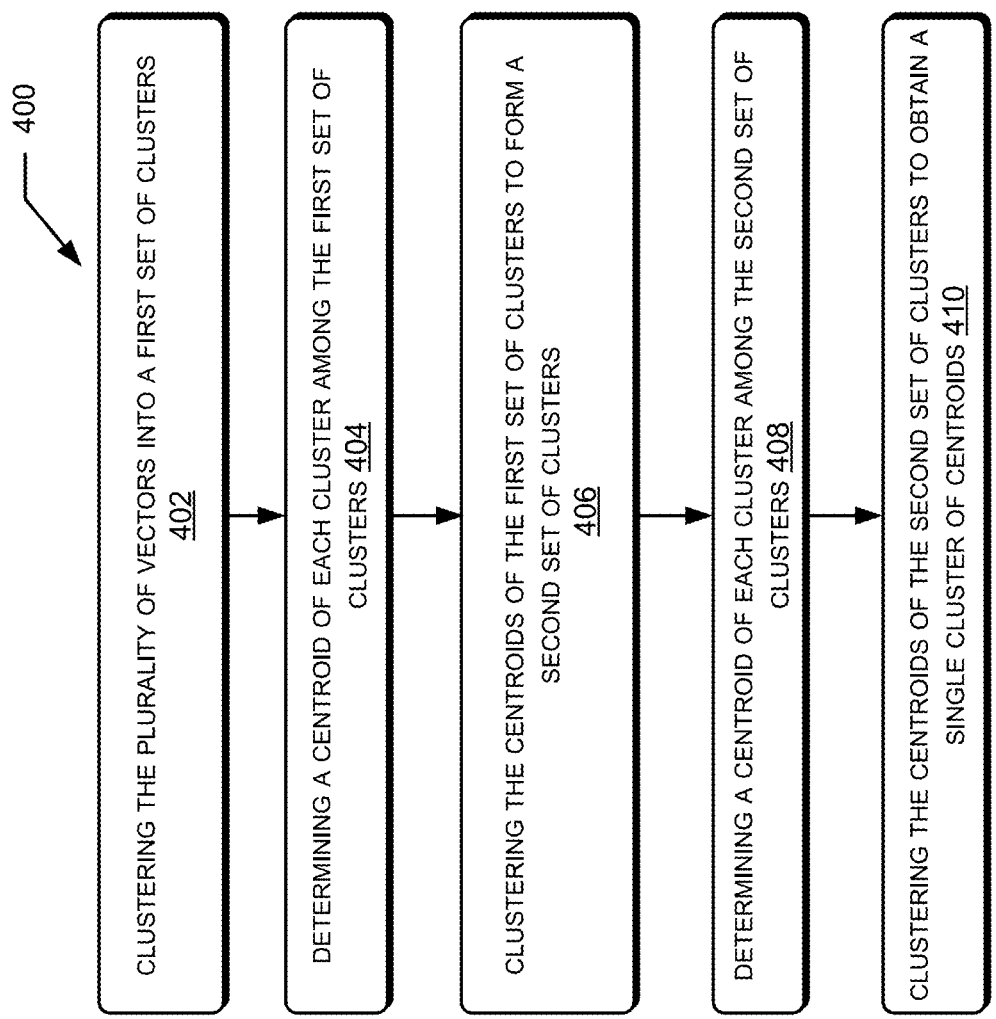
FIG. 4 illustrates a method for creating an index for plurality of vectors in a multi-tenant environment having a plurality of tenants, according to an example implementation of the present subject matter.

FIG. 4 illustrates a method 400 for creating an index of a tenant in a multi-tenant environment having a plurality of tenants, according to an example implementation of the present subject matter. The order in which the method 400 is described is not intended to be construed as a limitation, and any number of the described method blocks may be combined in any order to implement the method 400, or an alternative method. Furthermore, the method 400 may be implemented by processor(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 400 may be performed by the system 200.

At step 402, the method 400 includes clustering the plurality of vectors into a first set of clusters. Each cluster among the first set of clusters includes a pre-determined number of vectors from among the plurality of vectors. In an example, as illustrated in FIG. 1, the 100 million vectors $V_1$, $V_2$, ..., $V_{100,000,000}$ in the vector database may be arranged into first set of clusters, i.e., $V_1$ to $V_{2000}$, $V_{2001}$ to $V_{4000}$, $V_{4001}$ to $V_{6000}$, ..., $V_{99,998,001}$ to $V_{100,000,000}$. Each cluster of the first set of clusters may include 2000 vectors.

At step 404, a centroid of each cluster among the first set of clusters may be determined. In an example, as illustrated in FIGS. 1, $V_1$ to $V_{2000}$ is associated with a centroid $C_1^1$, $V_{2001}$ to $V_{4000}$ is associated with a centroid $C_2^1$, $V_{4001}$ to $V_{6000}$ is associated with a centroid $C_3^1$, ..., $V_{99,998,001}$ to $V_{100,000,000}$ is associated with a centroid $C_{50,000}^1$.

At step 406, the method 400 includes clustering the centroids of the first set of clusters to form a second set of clusters. The second set of clusters includes one or more centroids based on the plurality of vectors included in the first set of clusters. Each cluster among the second set of clusters includes a pre-determined number of centroids. In an example, as illustrated in FIG. 1, the centroids $C_1^1, C_2^1, C_3^1 ..., C_{50,0000}^1$ in the vector database may be arranged into second set of clusters, i.e., $C_1^1$ to $C_{2000}^1$, $C_{2001}^1$ to $C_{4000}^1$, ..., $C_{48,001}^1$ to $C_{50,000}^1$. Each cluster of the second set of clusters may include 2000 vectors.

Subsequently, at step 408, similar to step 404, a centroid for each cluster among the second set of clusters may be determined. In an example, as illustrated in FIGS. 1, $C_1^1$ to $C_{2000}^1$ is associated with a centroid $C_1^2$, $C_{2001}^1$ to $C_{4000}^1$ is associated with a centroid $C_2^2$, ..., $C_{48,001}^1$ to $C_{50,000}^1$ is associated with a centroid $C_{25}^2$.

At step 410, the centroids of the second set of clusters are clustered to obtain a single cluster of centroids. The single cluster of centroids includes a pre-determined number of centroids. In an example, as illustrated in FIG. 1, the centroids $C_1^2, C_2^2, ..., C_{25}^2$ are arranged to form a single cluster of centroids. For instance, the single cluster of centroids may include 25 centroids.

The created index may include a plurality of layers depending on the size of the index. For example, as illustrated in FIG. 1, the index 100 with 100 million vector data may include three layers. For the nearest neighbor search in the created index 100, only twenty-five comparison operations may initially be required to be performed in Layer 2. A nearest centroid may be selected from the Layer 2 and further comparison operations may be performed on the 2000 centroids in Layer 1 corresponding to the selected nearest centroid in Layer 2. Similarly, another 2000 comparison operations may be performed on the 2000 vectors in Layer 0 corresponding to the selected nearest centroid in Layer 1. Accordingly, such layer structure of the index 100 allows the user to zoom into the specific object in the S3 storage which may likely contain the nearest neighbor vectors. Such an approach provides the nearest neighbor vectors by performing only 4025 (25+2000+2000) comparison operation, thereby eliminating the requirement of performing the comparison operation on all the 100 million vectors present in the vector database. Therefore, such an approach provides quicker and effective nearest neighbor search results.

In an example implementation, the illustrated steps of the method 400 can be performed by a processor in the system 200 to build an index, as described in relation with FIG. 2, according to the following algorithm:

Perform K-Means clustering recursively to build the index and compute the centroids and clusters.
Compute the unique hash keys for each cluster.
Store each cluster as an object in S3 storage. Objects corresponding to the same index are saved in the same prefix.
Index metadata is added in the metadata table along with the current version of the index.
The index is ready to be served.

Figure 5:
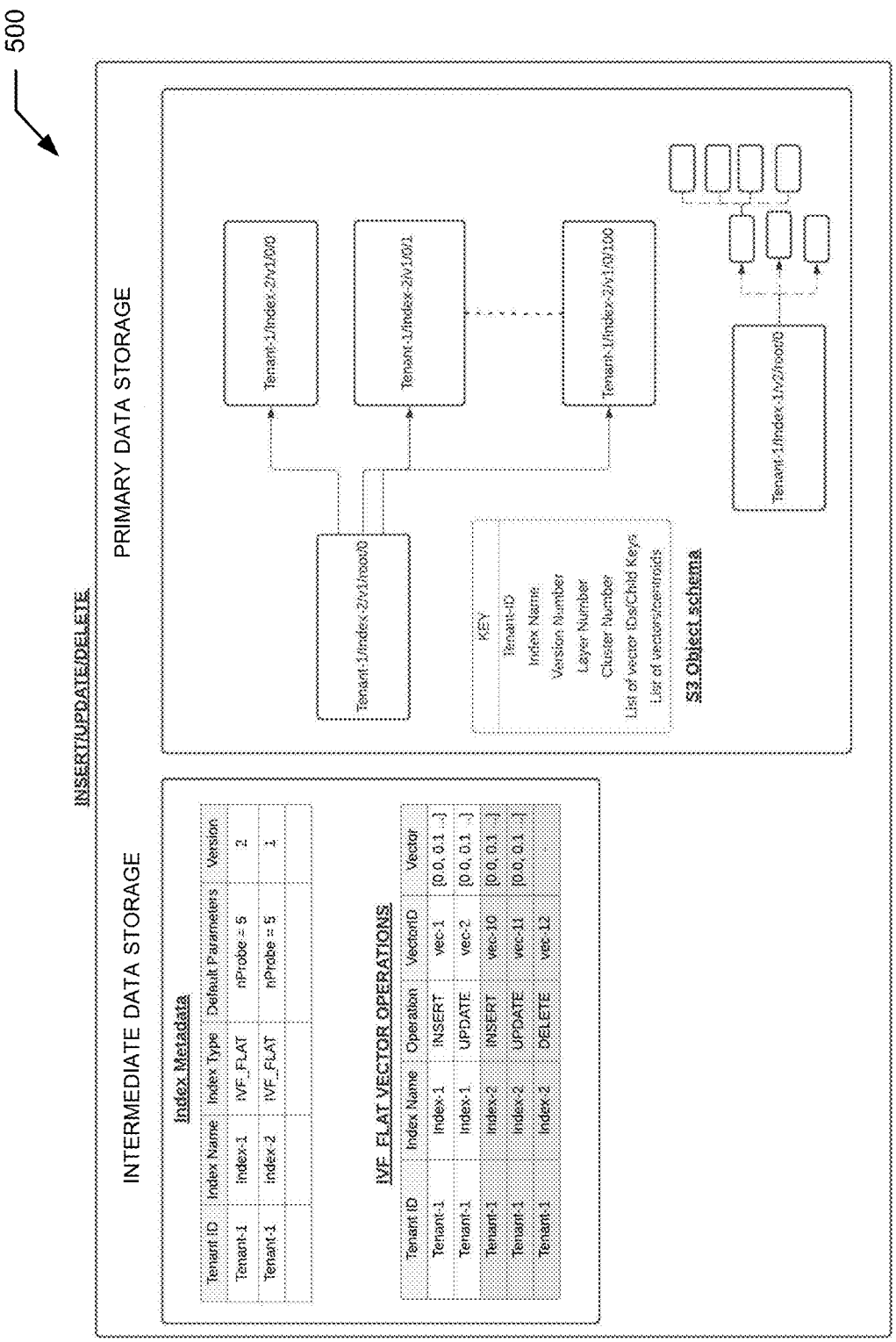
FIG. 5 illustrates an example approach to insert/update/delete vectors in the index, according to an example implementation of the present subject matter.

FIG. 5 shows an example approach 500 to insert/update/delete vectors in the index, according to an example implementation of the present subject matter. This figure shows any insert, update, delete entities are stored in the intermediate data storage unit 210. The index in the primary data storage unit 214 is left unmodified. For example, the system 200 may receive an insert request in the form of "Hey, can you insert vec-10 in index-2 for tenant-1". In another example, the system 200 may receive an update request in the form of "Hey, can you update vec-11 in index-2 for tenant-1". In yet another example, the system 200 may receive a delete request in the form of "Hey, can you delete vec-12 in index-2 for tenant-1". On receiving a request for insert/update/delete, a row is added in the IVF vector operations table corresponding to the requested operations. In an example, no changes are made in the index metadata table in the intermediate data storage unit 210 and the primary data storage unit 214.

In an example, the objects in the primary data storage unit 214 may be modified after a certain threshold of the number of operations or days to incorporate the changes into the index. This may be done to save computing time of re-clustering and to avoid excess S3 write costs which are almost 10× the read costs.

In an example implementation, the insert/update/delete vector operations in the index can be performed by a processor in the system 200, as described in relation with FIG. 2, according to the following algorithm:

Fetch index metadata.
Insert entity in IVF_FLAT_VECTOR_OPERATIONS table along with the operation (INSERT/UPDATE/DELETE) to be performed.

Figure 6:
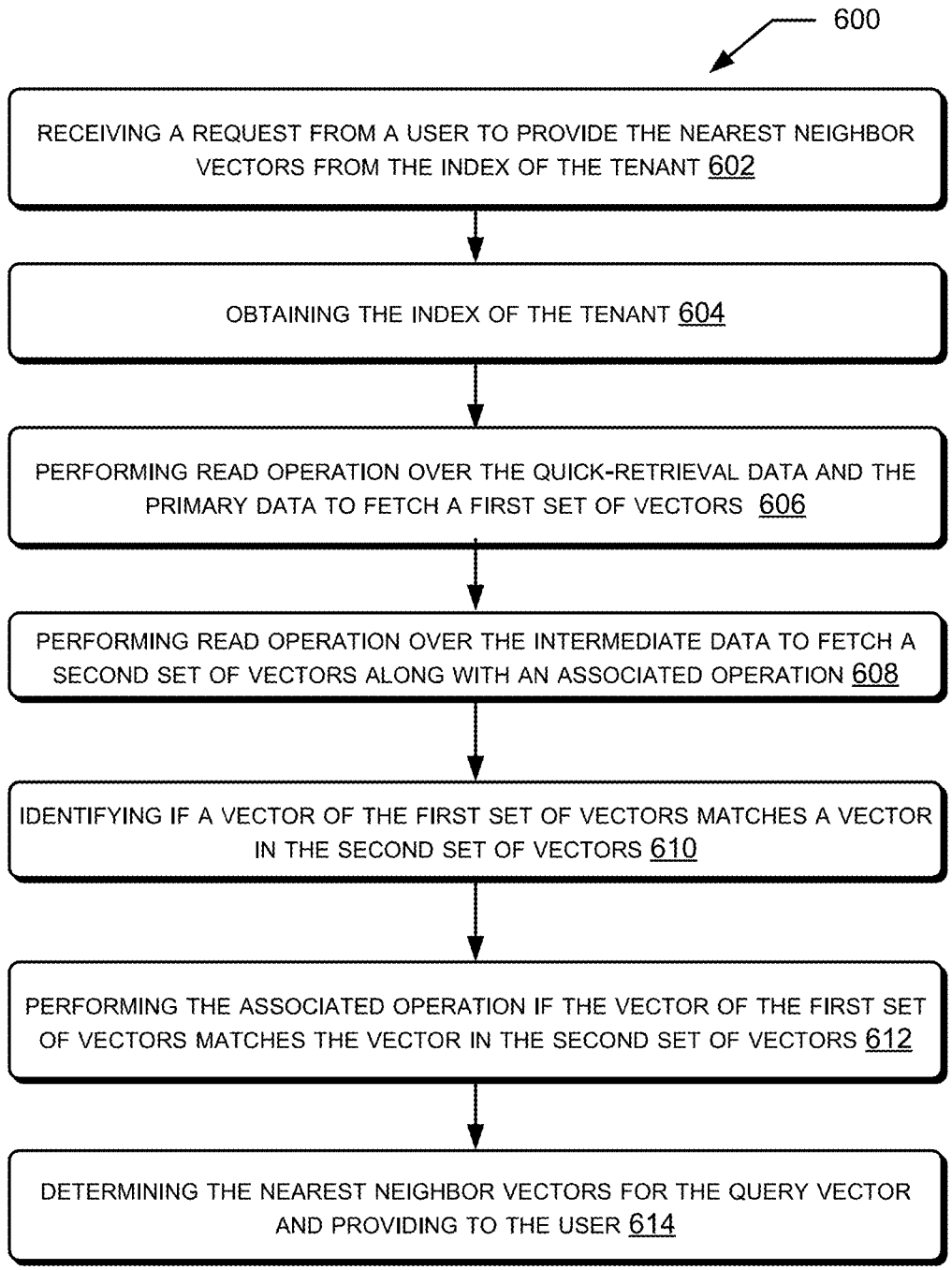
FIG. 6 illustrates a method for providing nearest neighbor vectors from an index of a tenant in a multi-tenant environment having a plurality of tenants, according to an example implementation of the present subject matter.

FIG. 6 illustrates a method 600 for providing nearest neighbor vectors from an index of a tenant in a multi-tenant environment having a plurality of tenants, according to an example implementation of the present subject matter. The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine-readable instructions, or a combination thereof.

It may be understood that steps of the method 600 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 600 may be performed by the system 200.

At step 602, the method 600 includes receiving a request from a user to provide the nearest neighbor vectors from the index of the tenant. The request includes a query vector and input parameters. For example, the input parameters indicate the number of objects to be read to fulfill the request of the user. In an example, the user 218 may make a request to the service 216 to provide the nearest neighbor vectors from the index of the tenant by stating "For a given vector, can you find me the nearest neighbor vectors for a given tenant and a given index?". In another example, the request may be "For a given vector, can you find me the nearest neighbor vectors for a given tenant and a given index by reading 5 objects?".

Then, at step 604, the method 600 includes obtaining the index of the tenant. The index includes a primary data, a quick-retrieval data, and an intermediate data. The intermediate data includes metadata information for the index, metadata information for the tenant, and vector operations associated with the index. The primary data includes the index of the tenant. The quick-retrieval data includes a cached part of the data from the primary data. In an example, the index is similar to the created index 100, as illustrated in FIG. 1.

At step 606, the method 600 includes performing read operation over the quick-retrieval data and the primary data to fetch a first set of vectors based on the user input parameters. The quick-retrieval data includes a part of the frequently queried primary data. In an example, each object is looked up in cache before reading from S3. For example, layer 2, as illustrated in FIG. 1, is cached in the quick-retrieval data storage unit 212 as the objects of layer 2 will always be fetched to respond to any nearest neighbor query. In such scenarios, reading layer 2 over the quick-retrieval data storage unit 212 may make the computation of the query request extremely fast when compared to reading layer 2 from the primary data storage unit 214. In addition, since each read operation in the primary data storage unit 214 is associated with a cost, therefore reading layer 2 over the quick-retrieval data storage unit 212 may also be cost-effective.

Then, at step 608, the read operation is performed over the intermediate to fetch a second set of vectors along with an associated operation. The associated operation comprises at least one of insert operation, delete operation, and update operation. The first set of vectors and the second set of vectors along with an associated operation are then stored in the memory.

At step 610, the method 600 includes identifying if a vector of the first set of vectors matches a vector in the second set of vectors. At step 612, if the vector of the first set of vectors matches the vector in the second set of vectors, the associated operation is performed. For example, if a vector associated with a delete operation from the second set of vectors matches with a vector from the first set of vectors, then the delete operation for the vector is performed. Accordingly, the deleted vector will not be considered in the search of nearest neighbor vector.

At step 614, the nearest neighbor vectors for the query vector are determined and provided to the user.

Figure 7:
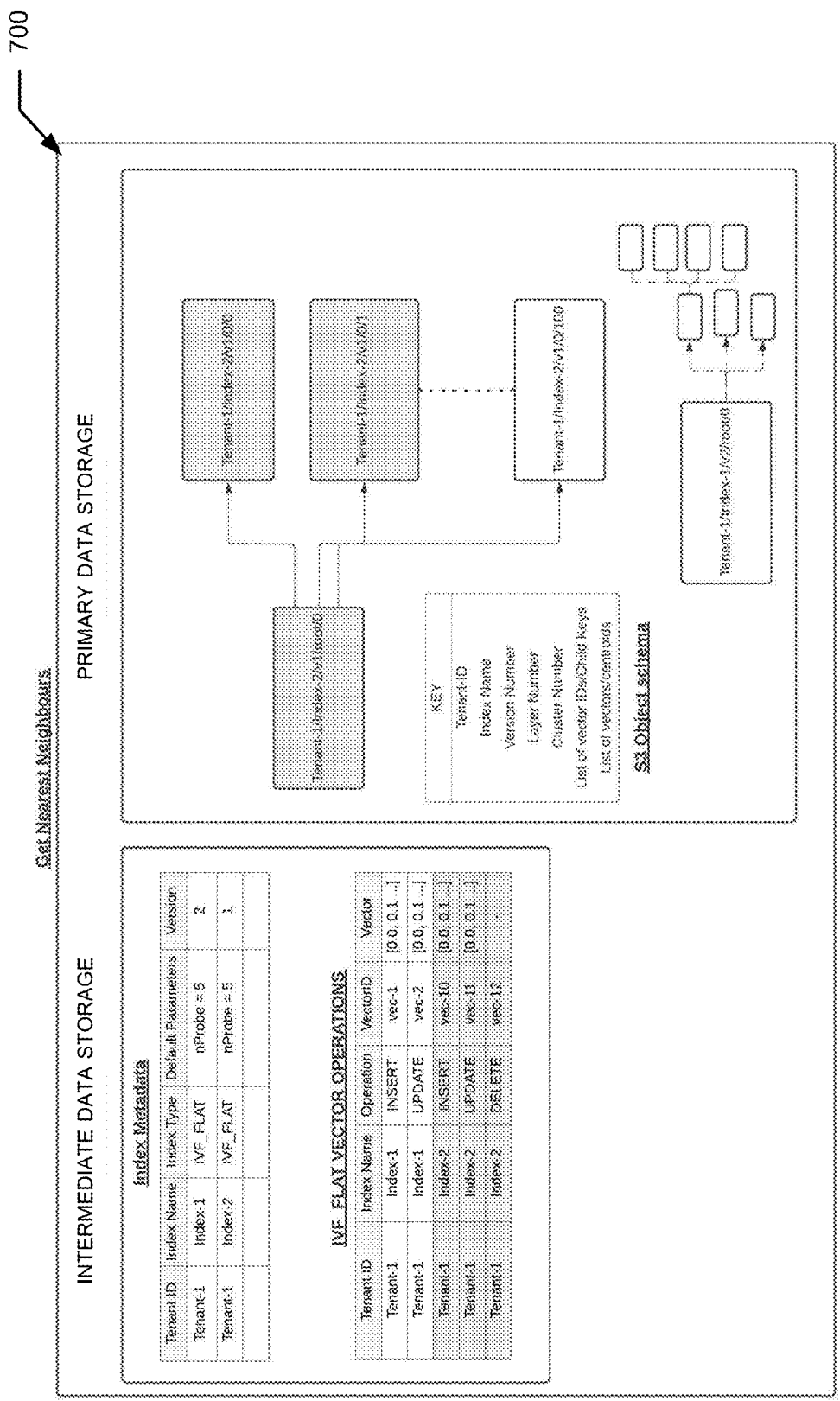
FIG. 7 illustrates an example approach to provide nearest neighbor vectors from an index of a tenant, according to an example implementation of the present subject matter.

FIG. 7 shows an example approach 700 to provide nearest neighbor vectors from an index of a tenant, according to an example implementation of the present subject matter. In an example implementation, the illustrated steps of the method 600 can be performed by a processor in the system 200 to provide nearest neighbor vectors from an index of a tenant, as described in relation with FIG. 2, according to the following algorithm:

Read index metadata from the intermediate data storage unit.
Compute hash key for the root node based on the index metadata.
Download root node from S3.
Fetch vector operations from the intermediate
data storage unit for the index and
store them in a map.

-continued

Find nearest centroid by linearly scanning over vectors in root node.
Cluster for the nearest centroid is downloaded from S3.
Repeat steps 5-6 till layer 1 is reached.
Download NProbe nearest clusters in layer 0 from S3 concurrently.
Initialise Bounded Min Heap where K = number of vectors to find.
For each cluster in downloaded clusters
  For each vector in cluster
    If vector does not exist in intermediate data storage unit map
      Insert in heap
    Else
      Continue
For each vector in intermediate data storage unit map
  If operation == "DELETE"
    Continue
  If operation == "INSERT" || operation == "UPDATE"
    Insert in heap
Return elements from heap.

Here, K nearest neighbors of the query are computed by scanning only the relevant parts of the index as mentioned in the above algorithm.

An illustrative example will now be provided to help explain embodiments of the invention. Assume the index given below where S3 contains only 1 node which contains 5 vectors (v1, v2, v3, v4, v5) and intermediate data storage unit contains a delete operation for v1.

| Tenant_id: tenant-1 |
| Index_Name: index-1 |
| Is_leaf: True |
| Version: 1 |
| Vector_ids: [v1, v2, v3, v4, v5] |
| Vectors: [[1.0, . . .], [ ], [ ], [ ], [ ]] |

| Tenant_id | Index_name | Operation | Vector_ID | Vector |
|---|---|---|---|---|
| tenant-1 | index-1 | DELETE | v1 | nil |
| tenant-1 | index-1 | UPDATE | v2 | [1.1, 1.2 . . .] |
| tenant-1 | index-1 | INSERT | v6 | [2.1, 2.2 . . .] |

The above data is fetched from S3 and intermediate data storage unit as per the above-mentioned algorithm. A bounded min heap is initialized with given K, where K=number of nearest neighbors required. Assume it to be 3 for this example. S3 object is scanned and vectors in it are inserted into the heap. Vector v1 and v2 are not inserted in the heap as they are present in the intermediate data storage unitmap.

Heap:
  V3, v4, v5

All the INSERT and UPDATE operations are inserted in the heap.

Heap:
  V3, v4, v5, v2, v6

The nearest items are returned from the heap.

The above example demonstrates how INSERT, UPDATE, DELETE operations from intermediate data storage unit are converged with the index in S3 to find nearest neighbors. Any vectors that have been returned by the S3 index but have been deleted are dropped while computing the nearest neighbors and for any vectors that have been updated, only the updated vector is used to compute the distance.

Figure 8:
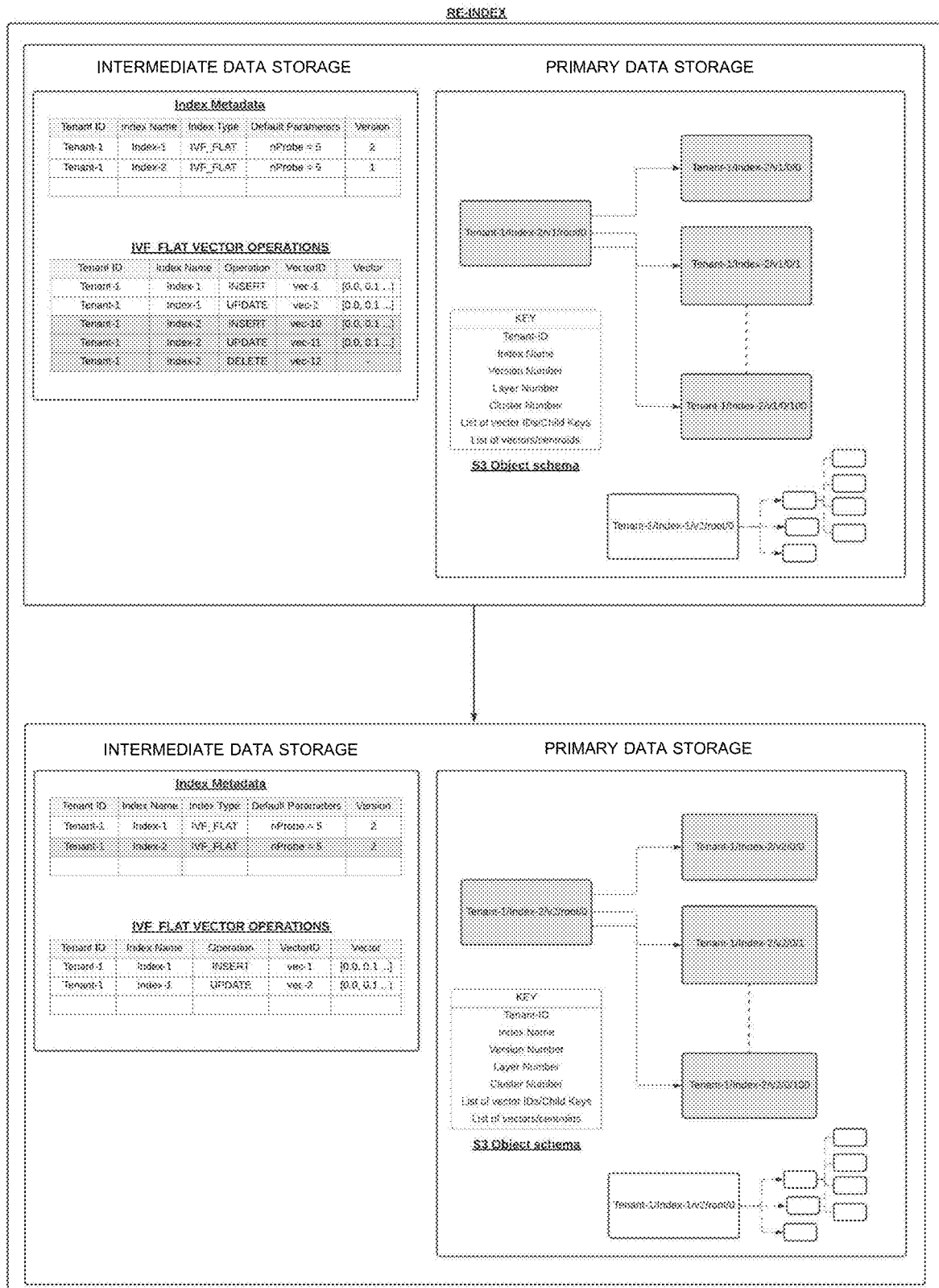
FIG. 8 illustrates an example approach to perform a re-index operation, according to an example implementation of the present subject matter.

FIG. 8 shows an approach to perform a re-index operation, in accordance with an example implementation. Re-Index is an asynchronous job that runs periodically whenever a certain configurable threshold of number of operations in intermediate data storage unit and time is reached. During re-Index, the data from intermediate data storage unit is migrated to S3 to enable fast lookup and reduce storage cost. There are many advantages of re-indexing the asynchronously. Index has no downtime. For example, the old version is deleted only when the new version is ready to be served. intermediate data storage unit is cleaned as the vectors are migrated from intermediate data storage unit to S3. Further, S3 costs are cheaper compared to postgres. In addition, re-indexing provides faster nearest neighbor search.

In an example, to perform the re-index operation for the plurality of new vectors of the tenant in the intermediate data storage unit, the plurality of new vectors of the tenant are read from the intermediate data storage unit. Further, the plurality of vectors of the tenant are read from the S3 storage, i.e., primary data storage unit. An updated index is created with an increased version number based on the created index. Accordingly, the version number is updated in the metadata information for the index in the intermediate data storage unit. Subsequently, the plurality of new vectors of the tenant are deleted from the intermediate data storage unit and the objects corresponding to an older version of the index are deleted from the S3 storage.

In an example implementation, the re-indexing of the data can be performed by a processor in the system 200, as described in relation with FIG. 2, according to the following algorithm:

---
Read all the vectors for the index from intermediate data storage unit.
Read all the leaf nodes for the index from S3 storage.
Use algorithm to build the index with an increased version number.
Update the version number in index metadata.
Delete the vectors of the index from the intermediate data storage unit.
Delete the objects corresponding to the older version of the index from S3.

---

The above first approach to re-index may be a bit expensive in terms of computations associated with computing the new clusters and S3 write costs in cases of large indexes.

In another example implementation, the re-indexing of the data can be performed by a processor in the system 200, as described in relation with FIG. 2, according to the following algorithm:

---
Read all the vectors for the index from intermediate data storage unit.
Read all the leaf nodes for the index from S3 storage.
For each insert operation in intermediate data storage unit
    Find the cluster with nearest centroid.
    Insert the vector to the nearest cluster.
    Update the centroid value.
For each delete operation in intermediate data storage unit
    Find the cluster in which the element is present.
    Delete the element from that cluster.
    Update the centroid value.
For each update operation in intermediate data storage unit
    Find the cluster with nearest centroid.
    Update the centroid value.
In case the number of vectors in a cluster
is large, the divide the cluster into 2
smaller clusters.
Append the 2 new centroids into the parent
object of the older cluster and delete
the older centroid from the parent cluster.
New hash keys are computed.
All the new objects are saved into the S3 storage.
Update the version number in index metadata.
Delete the vectors of the index from the intermediate data storage unit.
Delete the objects corresponding to the older version of the index from S3.

---

The above second approach to re-index may be slightly inaccurate when compared with the first approach, however, the second approach is a cost-efficient strategy to perform re-indexing.

Figure 9:
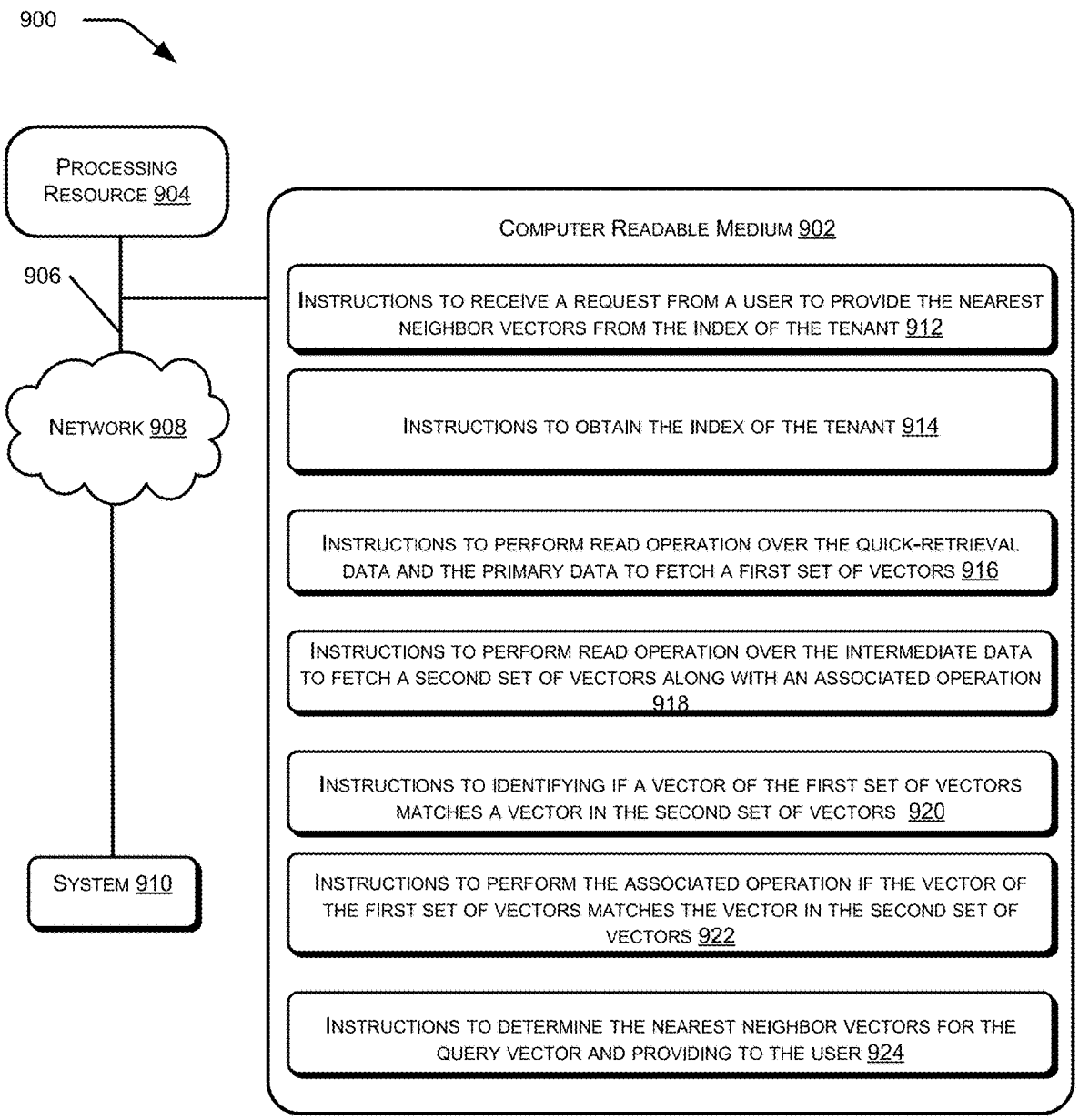
FIG. 9 illustrates a computing environment, implementing a non-transitory computer-readable medium for providing nearest neighbor vectors from an index of a tenant in a multi-tenant environment having a plurality of tenants, according to an example implementation of the present subject matter.

FIG. 9 illustrates a computing environment 900, implementing a non-transitory computer-readable medium for providing nearest neighbor vectors from an index of a tenant in a multi-tenant environment having a plurality of tenants, according to an example implementation of the present subject matter.

In an example, the non-transitory computer-readable medium 902 may be utilized by the system 910. The system 910 may correspond to the system 200. The system 910 may be implemented in a public networking environment or a private networking environment. In an example, the computing environment 900 may include a processing resource 904 communicatively coupled to the non-transitory computer-readable medium 902 through a communication link 906.

In an example, the processing resource 904 may be implemented in a device, such as the system 910. The non-transitory computer-readable medium 902 may be, for example, an internal memory device of the system 910 or an external memory device. In an implementation, the communication link 906 may be a direct communication link, such as any memory read/write interface. In another implementation, the communication link 906 may be an indirect communication link, such as a network interface. In such a case, the processing resource 904 may access the non-transitory computer-readable medium 902 through a network 908. The network 908 may be a single network or a combination of multiple networks and may use a variety of different communication protocols. The processing resource 904 and the non-transitory computer-readable medium 902 may also be communicatively coupled to the system 910 over the network 908.

In an example implementation, the non-transitory computer-readable medium 902 includes a set of computer-readable instructions to provide nearest neighbor vectors from an index to the user. The set of computer-readable instructions can be accessed by the processing resource 904 through the communication link 906 and subsequently executed to perform acts to provide feedback to the actuating object.

Referring to FIG. 9, in an example, the non-transitory computer-readable medium 1002 includes instructions 912 to receive a request from a user to provide the nearest neighbor vectors from the index of the tenant. The request includes a query vector and input parameters. For example, the input parameters indicate the number of objects to be read to fulfill the request of the user. In an example, the user 218 may make a request to the service 216 to provide the nearest neighbor vectors from the index of the tenant by stating "For a given vector, can you find me the nearest neighbor vectors for a given tenant and a given index?". In another example, the request may be "For a given vector, can you find me the nearest neighbor vectors for a given tenant and a given index by reading 5 objects?".

The non-transitory computer-readable medium 902 includes instructions 914 to obtain the index of the tenant. The index includes a primary data, a quick-retrieval data, and an intermediate data. The intermediate data includes metadata information for the index, metadata information for the tenant, and vector operations associated with the index. The primary data includes the index of the tenant. The quick-retrieval data includes a cached part of the data from the primary data. In an example, the index is similar to the created index 100, as illustrated in FIG. 1.

The non-transitory computer-readable medium 902 includes instructions 916 to perform read operation over the quick-retrieval data and the primary data to fetch a first set of vectors based on the user input parameters. The quick-retrieval data includes a part of the frequently queried primary data. In an example, each object is looked up in cache before reading from S3. For example, layer 2 as illustrated in FIG. 1 is cached in the quick-retrieval data storage unit 212 as the objects of layer 2 will always be fetched to respond to any nearest neighbor query. In such scenarios, reading layer 2 over the quick-retrieval data storage unit 212 may make the computation of the query request extremely fast when compared to reading layer 2 from the primary data storage unit 214. In addition, since each read operation in the primary data storage unit 214 is associated with a cost, therefore reading layer 2 over the quick-retrieval data storage unit 212 may also be cost-effective.

The non-transitory computer-readable medium 902 includes instructions 918 to perform the read operation over the intermediate data to fetch a second set of vectors along with an associated operation. The associated operation comprises at least one of insert operation, delete operation, and update operation. The first set of vectors and the second set of vectors along with an associated operation are then stored in the memory.

The non-transitory computer-readable medium 902 includes instructions 920 to identify if a vector of the first set of vectors matches a vector in the second set of vectors. The non-transitory computer-readable medium 902 includes instructions 922 to perform the associated operation if the vector of the first set of vectors matches the vector in the second set of vectors.

The non-transitory computer-readable medium 902 includes instructions 924 to determine the nearest neighbor vectors for the query vector and provide to the user.

The present subject matter is directed to an improved approach to implement a vector database. The present approach uses cost effective storage and allows the system to store embeddings in the form of vectors and creates indexes for each tenant which can then be queried to compute the nearest neighbor vectors to any input vector. Some embodiments permit enhanced application of an approximate nearest neighbor search such as similarity search, semantic search, ticket de-duplication and deflections. In the present subject matter, the vector database supports a live index that allows synchronous Create/Update/Delete operations to the vector entities.

Further, the vector database provides fast and efficient billion scale approximate nearest neighbor search for multiple tenants. Unlike conventional vector database solutions which does not scale in a multi-tenant environment and requires significant amount of memory associated with high costs, the present subject matter is a 100% on-disk solution, thereby ensuring that the indexes can be scaled to millions of tenants while keeping the memory costs minimal. Accordingly, the present subject matter provides an improved and efficient approach to implement a vector database.

Although examples and implementations of present subject matter have been described in language specific to structural features and/or methods, it is to be understood that the present subject matter is not necessarily limited to the specific features or methods described. Rather, the specific features and methods are disclosed and explained in the context of a few example implementations of the present subject matter.

What is claimed is:
1. A system comprising:
a vector data storage unit to be deployed in a multi-tenant environment having a plurality of tenants; the vector data storage unit comprising:
an intermediate data storage unit to store metadata information for a plurality of vectors, metadata information for the plurality of tenants, and vector operations associated with the plurality of vectors, the intermediate data storage unit including an indexing processor for creating an index for the plurality of vectors, wherein the indexing processor is to:
cluster the plurality of vectors into a first set of clusters, wherein each cluster among the first set of clusters includes a pre-determined number of vectors from among the plurality of vectors;
determine a centroid of each cluster among the first set of clusters, wherein the centroid indicates a center of the cluster;
cluster the centroids of the first set of clusters to form a second set of clusters, the second set of clusters including one or more centroids based on the plurality of vectors included in the first set of clusters; wherein each cluster among the second set of clusters includes a pre-determined number of centroids;
determine a centroid of each cluster among the second set of clusters; and
cluster the centroids of the second set of clusters to obtain a single cluster of centroids, the single cluster of centroids includes a pre-determined number of centroids;
a primary data storage unit to store the index for the plurality of vectors; and
a quick-retrieval data storage unit to cache a segment of a data stored in the primary data storage unit, wherein the segment of the data includes a periodic queried data from the primary data;
wherein the vector data storage unit comprises:
a service for communicating between the intermediate data storage unit, the primary data storage unit, and the quick-retrieval data storage unit;
wherein each vector of the plurality of vectors in the primary data storage unit is identified by one or more attributes, the one or more attributes comprising a tenant-ID, an index name, a version number, a layer number, and a cluster name;
wherein the indexing processor performs:
receive a plurality of new vectors along with associated vector operations from one or more users;
insert the plurality of new vectors in the intermediate data storage unit;
perform a re-index operation for the plurality of new vectors of the tenant based on a created index upon reaching a threshold number of new vectors in the intermediate data storage unit;
transfer re-indexed vectors to the primary data storage unit; and
store each cluster of the re-indexed vectors as a separate object in the primary data storage unit; and
wherein to perform the re-index operation for the plurality of new vectors of the tenant, the indexing processor performs:
read the plurality of new vectors of the tenant from the intermediate data storage unit;

read the plurality of vectors of the tenant from the primary data storage unit;
build an updated index with an increased version number based on the created index;
update the version number in the metadata information for the index in the intermediate data storage unit;
delete the plurality of new vectors of the tenant from the intermediate data storage unit; and
delete the objects corresponding to an older version of the index from the primary data storage unit.

2. The system of claim 1, wherein the metadata information includes attributes comprising an index name, a tenant ID, an index type, default query parameters, and a version of the index.

3. The system of claim 1, wherein the indexing processor is to create a hierarchical index including plurality of layers, wherein a first layer from the plurality of layers corresponds to the first set of clusters, a second layer from the plurality of layers corresponds to the second set of clusters, and a third layer from the plurality of layers corresponds to the single cluster of centroids.

4. The system of claim 1, wherein a data in the quick-retrieval data storage unit has an associated time to live (TTL) of a predetermined time period.

5. A system, comprising:
a vector data storage unit to be deployed in a multi-tenant environment having a plurality of tenants; the vector data storage unit comprising:
an intermediate data storage unit to store metadata information for a plurality of vectors, metadata information for the plurality of tenants, and vector operations associated with the plurality of vectors, the intermediate data storage unit including an indexing processor for creating an index for the plurality of vectors, wherein the indexing processor is to:
cluster the plurality of vectors into a first set of clusters, wherein each cluster among the first set of clusters includes a pre-determined number of vectors from among the plurality of vectors;
determine a centroid of each cluster among the first set of clusters, wherein the centroid indicates a center of the cluster;
cluster the centroids of the first set of clusters to form a second set of clusters, the second set of clusters including one or more centroids based on the plurality of vectors included in the first set of clusters; wherein each cluster among the second set of clusters includes a pre-determined number of centroids;
determine a centroid of each cluster among the second set of clusters; and
cluster the centroids of the second set of clusters to obtain a single cluster of centroids, the single cluster of centroids includes a pre-determined number of centroids;
a primary data storage unit to store the index for the plurality of vectors; and
a quick-retrieval data storage unit to cache a segment of a data stored in the primary data storage unit, wherein the segment of the data includes a periodic queried data from the primary data;
wherein the vector data storage unit comprises:
a service for communicating between the intermediate data storage unit, the primary data storage unit, and the quick-retrieval data storage unit;
wherein each vector of the plurality of vectors in the primary data storage unit is identified by one or more attributes, the one or more attributes comprising a tenant-ID, an index name, a version number, a layer number, and a cluster name;
wherein the indexing processor performs:
receive a plurality of new vectors along with associated vector operations from one or more users;
insert the plurality of new vectors in the intermediate data storage unit;
perform a re-index operation for the plurality of new vectors of the tenant based on a created index upon reaching a threshold number of new vectors in the intermediate data storage unit;
transfer re-indexed vectors to the primary data storage unit; and
store each cluster of the re-indexed vectors as a separate object in the primary data storage unit; and
wherein to perform the re-index operation for the plurality of new vectors of the tenant, the indexing processor performs:
read the plurality of new vectors of the tenant from the intermediate data storage unit, the plurality of new vectors is associated with an operation, wherein the associated operation comprises at least one of insert, delete, and update operation;
read the plurality of vectors of the tenant from the primary data storage unit;
insert the new vectors associated with the insert operation among the plurality of new vectors to a nearest cluster, for each insert operation;
delete the new vectors associated with the delete operation among the plurality of new vectors from a cluster having vectors corresponding to the new vectors, for each delete operation;
update the new vectors associated with the update operation among the plurality of new vectors from a cluster having vectors corresponding to the new vectors, for each update operation;
update a version number in the metadata information for the index in the intermediate data storage unit;
delete the plurality of new vectors of the tenant from the intermediate data storage unit; and
delete the objects corresponding to an older version of the index from the primary data storage unit.

6. The system of claim 5, wherein the metadata information includes attributes comprising an index name, a tenant ID, an index type, default query parameters, and a version of the index.

7. The system of claim 5, wherein the indexing processor is to create a hierarchical index including plurality of layers, wherein a first layer from the plurality of layers corresponds to the first set of clusters, a second layer from the plurality of layers corresponds to the second set of clusters, and a third layer from the plurality of layers corresponds to the single cluster of centroids.

8. The system of claim 5, wherein a data in the quick-retrieval data storage unit has an associated time to live (TTL) of a predetermined time period.

9. A method for providing nearest neighbor vectors from an index of a tenant in a multi-tenant environment having a plurality of tenants, the method comprising:
receiving a request from a user to provide the nearest neighbor vectors from the index of the tenant, wherein the request includes a query vector and input parameters, the input parameters indicating a number of objects to be read to fulfill the request of the user;
obtaining the index of the tenant, the index comprising a primary data, a quick-retrieval data, and an intermediate data;

performing read operation over the quick-retrieval data and the primary data to fetch a first set of vectors based on user input parameters;

performing read operation over the intermediate data to fetch a second set of vectors along with an associated operation, wherein the associated operations comprise at least one of insert, delete, and update operation;

storing the first set of vectors and the second set of vectors along with an associated operation;

identifying if a vector of the first set of vectors matches a vector in the second set of vectors;

performing the associated operation if the vector of the first set of vectors matches the vector in the second set of vectors;

determining the nearest neighbor vectors for the query vector; and providing the determined nearest neighbor vectors to the user;

wherein to obtain the index, the method comprising:

clustering a plurality of vectors into a first set of clusters, wherein each cluster among the first set of clusters includes a pre-determined number of vectors from among the plurality of vectors;

determining a centroid of each cluster among the first set of clusters, wherein the centroid indicates a center of the cluster;

clustering the centroids of the first set of clusters to form a second set of clusters, the second set of clusters including one or more centroids based on the plurality of vectors included in the first set of clusters; wherein each cluster among the second set of clusters includes a pre-determined number of centroids;

determining a centroid of each cluster among the second set of clusters; and clustering the centroids of the second set of clusters to obtain a single cluster of centroids, the single cluster of centroids includes a pre-determined number of centroids;

receiving a plurality of new vectors along with associated vector operations from one or more users;

inserting the plurality of new vectors in an intermediate data storage unit;

performing a re-index operation for the plurality of new vectors of the tenant based on a created index upon reaching a threshold number of new vectors in the intermediate data storage unit;

transferring re-indexed vectors to the primary data storage unit; and storing each cluster of the re-indexed vectors as a separate object in the primary data storage unit;

wherein to perform the re-index operation for the plurality of new vectors of the tenant, the method comprising:

reading the plurality of new vectors of the tenant from the intermediate data storage unit;

reading the plurality of vectors of the tenant from the primary data storage unit;

building an updated index with an increased version number based on the created index;

updating a version number in the metadata information for the index in the intermediate data storage unit;

deleting the plurality of new vectors of the tenant from the intermediate data storage unit; and deleting the objects corresponding to an older version of the index from the primary data storage unit.

10. The method of claim 9, wherein the intermediate data includes metadata information for the index, metadata information for the tenant, and vector operations associated with the index; wherein the primary data includes the index of the tenant; and wherein the quick-retrieval data includes a cached part of the data from the primary data.

11. The method of claim 9, wherein the quick-retrieval data has an associated time to live (TTL) of a predetermined time period, the quick-retrieval data includes frequently queried primary data.

12. The method of claim 9, wherein the index is a hierarchical index including plurality of layers, wherein a first layer from the plurality of layers corresponds to the first set of clusters, a second layer from the plurality of layers corresponds to the second set of clusters, and a third layer from the plurality of layers corresponds to the single cluster of centroids.

13. A method for providing nearest neighbor vectors from an index of a tenant in a multi-tenant environment having a plurality of tenants, the method comprising:

receiving a request from a user to provide the nearest neighbor vectors from the index of the tenant, wherein the request includes a query vector and input parameters, the input parameters indicating a number of objects to be read to fulfill the request of the user;

obtaining the index of the tenant, the index comprising a primary data, a quick-retrieval data, and an intermediate data;

performing read operation over the quick-retrieval data and the primary data to fetch a first set of vectors based on user input parameters;

performing read operation over the intermediate data to fetch a second set of vectors along with an associated operation, wherein the associated operations comprise at least one of insert, delete, and update operation;

storing the first set of vectors and the second set of vectors along with an associated operation;

identifying if a vector of the first set of vectors matches a vector in the second set of vectors;

performing the associated operation if the vector of the first set of vectors matches the vector in the second set of vectors;

determining the nearest neighbor vectors for the query vector; and providing the determined nearest neighbor vectors to the user;

wherein to obtain the index, the method comprising:

clustering a plurality of vectors into a first set of clusters, wherein each cluster among the first set of clusters includes a pre-determined number of vectors from among the plurality of vectors;

determining a centroid of each cluster among the first set of clusters, wherein the centroid indicates a center of the cluster;

clustering the centroids of the first set of clusters to form a second set of clusters, the second set of clusters including one or more centroids based on the plurality of vectors included in the first set of clusters; wherein each cluster among the second set of clusters includes a pre-determined number of centroids;

determining a centroid of each cluster among the second set of clusters; and clustering the centroids of the second set of clusters to obtain a single cluster of centroids, the single cluster of centroids includes a pre-determined number of centroids;

receiving a plurality of new vectors along with associated vector operations from one or more users;

inserting the plurality of new vectors in an intermediate data storage unit;
performing a re-index operation for the plurality of new vectors of the tenant based on a created index upon reaching a threshold number of new vectors in the intermediate data storage unit;
transferring re-indexed vectors to the primary data storage unit; and
storing each cluster of the re-indexed vectors as a separate object in the primary data storage unit;
wherein to perform the re-index operation for the plurality of new vectors of the tenant, performing:
reading the plurality of new vectors of the tenant from the intermediate data storage unit, the plurality of new vectors is associated with an operation, wherein the associated operations comprises at least one of insert, delete, and update operation;
reading the plurality of vectors of the tenant from the primary data storage unit;
inserting the new vectors associated with the insert operation among the plurality of new vectors to a nearest cluster, for each insert operation;
deleting the new vectors associated with the delete operation among the plurality of new vectors from a cluster having vectors corresponding to the new vectors, for each delete operation;
updating the new vectors associated with the update operation among the plurality of new vectors from a cluster having vectors corresponding to the new vectors, for each update operation;
updating a version number in the metadata information for the index in the intermediate data storage unit;
deleting the plurality of new vectors of the tenant from the intermediate data storage unit; and
deleting the objects corresponding to an older version of the index from the primary data storage unit.

14. The method of claim 13, wherein the intermediate data includes metadata information for the index, metadata information for the tenant, and vector operations associated with the index; wherein the primary data includes the index of the tenant; and wherein the quick-retrieval data includes a cached part of the data from the primary data.

15. The method of claim 13, wherein the quick-retrieval data has an associated time to live (TTL) of a predetermined time period, the quick-retrieval data includes frequently queried primary data.

16. The method of claim 13, wherein the index is a hierarchical index including plurality of layers, wherein a first layer from the plurality of layers corresponds to the first set of clusters, a second layer from the plurality of layers corresponds to the second set of clusters, and a third layer from the plurality of layers corresponds to the single cluster of centroids.

17. A non-transitory computer-readable medium comprising instructions to provide nearest neighbor vectors from an index of a tenant in a multi-tenant environment having a plurality of tenants, the instructions being executable by a processing resource to:
receive a request from a user to provide the nearest neighbor vectors from the index of the tenant, wherein the request includes a query vector and input parameters, the input parameters indicating a number of objects to be read to fulfill the request of the user;
obtain the index of the tenant, the index comprising a primary data, a quick-retrieval data, and an intermediate data;
perform read operation over the quick-retrieval data and the primary data to fetch a first set of vectors based on user input parameters; the quick-retrieval data includes a part of frequently queried primary data;
perform read operation over the intermediate data to fetch a second set of vectors along with an associated operation, wherein the associated operations comprise at least one of insert, delete, and update operation;
store the first set of vectors and the second set of vectors along with an associated operation;
identify if a vector of the first set of vectors matches a vector in the second set of vectors;
perform the associated operation if the vector of the first set of vectors matches the vector in the second set of vectors;
determine the nearest neighbor vectors for the query vector; and
provide the determined nearest neighbor vectors to the user;
wherein to obtain the index, the method comprising:
clustering a plurality of vectors into a first set of clusters, wherein each cluster among the first set of clusters includes a pre-determined number of vectors from among the plurality of vectors;
determining a centroid of each cluster among the first set of clusters, wherein the centroid indicates a center of the cluster;
clustering the centroids of the first set of clusters to form a second set of clusters, the second set of clusters including one or more centroids based on the plurality of vectors included in the first set of clusters; wherein each cluster among the second set of clusters includes a pre-determined number of centroids;
determining a centroid of each cluster among the second set of clusters; and
clustering the centroids of the second set of clusters to obtain a single cluster of centroids, the single cluster of centroids includes a pre-determined number of centroids;
receiving a plurality of new vectors along with associated vector operations from one or more users;
inserting the plurality of new vectors in an intermediate data storage unit;
performing a re-index operation for the plurality of new vectors of the tenant based on a created index upon reaching a threshold number of new vectors in the intermediate data storage unit;
transferring re-indexed vectors to the primary data storage unit; and
storing each cluster of the re-indexed vectors as a separate object in the primary data storage unit;
wherein to perform the re-index operation for the plurality of new vectors of the tenant, the method comprising:
reading the plurality of new vectors of the tenant from the intermediate data storage unit;
reading the plurality of vectors of the tenant from the primary data storage unit;
building an updated index with an increased version number based on the created index;
updating a version number in the metadata information for the index in the intermediate data storage unit;
deleting the plurality of new vectors of the tenant from the intermediate data storage unit; and
deleting the objects corresponding to an older version of the index from the primary data storage unit.

18. The non-transitory computer-readable medium of claim 17, wherein the intermediate data includes metadata information for the index, metadata information for the tenant, and vector operations associated with the index; wherein the primary data includes the index of the tenant; and wherein the quick-retrieval data includes a cached part of the data from the primary data.

19. The non-transitory computer-readable medium of claim 17, wherein the quick-retrieval data has an associated time to live (TTL) of a predetermined time period, the quick-retrieval data includes the frequently queried primary data.

20. The non-transitory computer-readable medium of claim 17, wherein the index is a hierarchical index including plurality of layers, wherein a first layer from the plurality of layers corresponds to the first set of clusters, a second layer from the plurality of layers corresponds to the second set of clusters, and a third layer from the plurality of layers corresponds to the single cluster of centroids.

21. A non-transitory computer-readable medium comprising instructions to provide nearest neighbor vectors from an index of a tenant in a multi-tenant environment having a plurality of tenants, the instructions being executable by a processing resource to:
receive a request from a user to provide the nearest neighbor vectors from the index of the tenant, wherein the request includes a query vector and input parameters, the input parameters indicating a number of objects to be read to fulfill the request of the user;
obtain the index of the tenant, the index comprising a primary data, a quick-retrieval data, and an intermediate data;
perform read operation over the quick-retrieval data and the primary data to fetch a first set of vectors based on user input parameters; the quick-retrieval data includes a part of frequently queried primary data;
perform read operation over the intermediate data to fetch a second set of vectors along with an associated operation, wherein the associated operations comprise at least one of insert, delete, and update operation;
store the first set of vectors and the second set of vectors along with an associated operation;
identify if a vector of the first set of vectors matches a vector in the second set of vectors;
perform the associated operation if the vector of the first set of vectors matches the vector in the second set of vectors;
determine the nearest neighbor vectors for the query vector; and
provide the determined nearest neighbor vectors to the user;
wherein to obtain the index, the method comprising:
clustering a plurality of vectors into a first set of clusters, wherein each cluster among the first set of clusters includes a pre-determined number of vectors from among the plurality of vectors;
determining a centroid of each cluster among the first set of clusters, wherein the centroid indicates a center of the cluster;
clustering the centroids of the first set of clusters to form a second set of clusters, the second set of clusters including one or more centroids based on the plurality of vectors included in the first set of clusters; wherein each cluster among the second set of clusters includes a pre-determined number of centroids;
determining a centroid of each cluster among the second set of clusters; and
clustering the centroids of the second set of clusters to obtain a single cluster of centroids, the single cluster of centroids includes a pre-determined number of centroids;
receiving a plurality of new vectors along with associated vector operations from one or more users;
inserting the plurality of new vectors in an intermediate data storage unit;
performing a re-index operation for the plurality of new vectors of the tenant based on a created index upon reaching a threshold number of new vectors in the intermediate data storage unit;
transferring re-indexed vectors to the primary data storage unit; and
storing each cluster of the re-indexed vectors as a separate object in the primary data storage unit;
wherein to perform the re-index operation for the plurality of new vectors of the tenant, performing:
reading the plurality of new vectors of the tenant from the intermediate data storage unit, the plurality of new vectors is associated with an operation, wherein the associated operations comprises at least one of insert, delete, and update operation;
reading the plurality of vectors of the tenant from the primary data storage unit;
inserting the new vectors associated with the insert operation among the plurality of new vectors to a nearest cluster, for each insert operation;
deleting the new vectors associated with the delete operation among the plurality of new vectors from a cluster having vectors corresponding to the new vectors, for each delete operation;
updating the new vectors associated with the update operation among the plurality of new vectors from a cluster having vectors corresponding to the new vectors, for each update operation;
updating a version number in the metadata information for the index in the intermediate data storage unit;
deleting the plurality of new vectors of the tenant from the intermediate data storage unit; and
deleting the objects corresponding to an older version of the index from the primary data storage unit.

22. The non-transitory computer-readable medium of claim 21, wherein the intermediate data includes metadata information for the index, metadata information for the tenant, and vector operations associated with the index; wherein the primary data includes the index of the tenant; and wherein the quick-retrieval data includes a cached part of the data from the primary data.

23. The non-transitory computer-readable medium of claim 21, wherein the quick-retrieval data has an associated time to live (TTL) of a predetermined time period, the quick-retrieval data includes the frequently queried primary data.

24. The non-transitory computer-readable medium of claim 21, wherein the index is a hierarchical index including plurality of layers, wherein a first layer from the plurality of layers corresponds to the first set of clusters, a second layer from the plurality of layers corresponds to the second set of clusters, and a third layer from the plurality of layers corresponds to the single cluster of centroids.

* * * * *